(12) United States Patent
Zheng et al.

(10) Patent No.: US 9,096,991 B2
(45) Date of Patent: Aug. 4, 2015

(54) WORKING MACHINE

(71) Applicant: KOBELCO CONSTRUCTION MACHINERY CO., LTD., Hiroshima-shi (JP)

(72) Inventors: Yushi Zheng, Hiroshima (JP); Kazuhiro Uesugi, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 15 days.

(21) Appl. No.: 14/157,653

(22) Filed: Jan. 17, 2014

(65) Prior Publication Data

US 2014/0205411 A1 Jul. 24, 2014

(30) Foreign Application Priority Data

Jan. 22, 2013 (JP) ................. 2013-009570

(51) Int. Cl.
| | |
|---|---|
| *E02F 3/38* | (2006.01) |
| *B62D 25/20* | (2006.01) |
| *E02F 3/32* | (2006.01) |
| *E02F 9/08* | (2006.01) |
| *E02F 3/30* | (2006.01) |
| *B62D 21/18* | (2006.01) |

(52) U.S. Cl.
CPC ............... *E02F 3/384* (2013.01); *B62D 25/20* (2013.01); *E02F 3/30* (2013.01); *E02F 3/325* (2013.01); *E02F 3/382* (2013.01); *E02F 9/0808* (2013.01); *E02F 9/0816* (2013.01); *B62D 21/186* (2013.01)

(58) Field of Classification Search
CPC ........ B62D 21/00; B62D 21/10; B62D 21/18; B62D 21/186; B62D 25/20; B62D 33/00; B62D 33/06; B62D 33/0633; B62D 33/077; E02F 3/00; E02F 3/30; E02F 3/36; E02F 3/3604; E02F 3/369; E02F 3/38; E02F 3/382; E02F 3/384; E02F 3/28; E02F 3/283; E02F 3/325; E02F 9/08; E02F 9/0808; E02F 9/0816
See application file for complete search history.

(56) References Cited

U.S. PATENT DOCUMENTS

| | | | | |
|---|---|---|---|---|
| 4,056,250 | A | * | 11/1977 | Uchiyama ..................... 248/674 |
| 4,087,009 | A | * | 5/1978 | Profenna et al. .............. 414/686 |
| 4,168,087 | A | * | 9/1979 | Paplaski et al. ............... 280/785 |
| 4,728,251 | A | * | 3/1988 | Takashima et al. ........... 414/694 |
| 6,062,334 | A | * | 5/2000 | Deneve et al. ................ 180/311 |

(Continued)

FOREIGN PATENT DOCUMENTS

| | | |
|---|---|---|
| JP | 2002-146834 | 5/2002 |
| JP | 2005-16019 | 1/2005 |
| JP | 2005-336920 | 12/2005 |

*Primary Examiner* — Ruth Ilan
*Assistant Examiner* — Barry Gooden, Jr.
(74) *Attorney, Agent, or Firm* — Oblon, McClelland, Maier & Neustadt, L.L.P.

(57) ABSTRACT

A front bracket has a fixed part that is fixed to a bottom plate and vertical plates, and a pair of protruded parts that are protruded backward from a rear part of the fixed part so as to extend upper parts of sidewall parts. The fixed part and the protruded parts are sandwiched between opposite surfaces that are opposite to each other at front parts of the vertical plates. The protruded parts are welded to opposite surfaces of the vertical plates that are brought into contact with the protruded parts. Each welded portion between the protruded part and the opposite surface of the vertical plate is formed along an edge of the protruded part that is in contact with the opposite surface of the vertical plate.

8 Claims, 11 Drawing Sheets

(56) References Cited

U.S. PATENT DOCUMENTS

| | | | |
|---|---|---|---|
| 6,158,949 A * | 12/2000 | Walth et al. | 414/722 |
| 7,188,865 B2 * | 3/2007 | Sugiyama et al. | 280/759 |
| 7,204,047 B2 * | 4/2007 | Murakami | 37/347 |
| 7,320,380 B2 * | 1/2008 | Ueda et al. | 180/327 |
| 7,338,114 B2 * | 3/2008 | Ishii et al. | 296/190.05 |
| 7,431,383 B2 * | 10/2008 | Katayama et al. | 296/190.08 |
| 7,481,289 B2 * | 1/2009 | Ueda et al. | 180/89.16 |
| 7,500,532 B2 * | 3/2009 | Koga et al. | 180/89.13 |
| 7,503,419 B2 * | 3/2009 | Miyake | 180/327 |
| 8,267,217 B2 * | 9/2012 | Kotani et al. | 180/312 |
| 8,397,851 B2 * | 3/2013 | Ueda | 180/68.1 |
| 8,419,339 B2 * | 4/2013 | Okumura et al. | 414/723 |
| D686,252 S * | 7/2013 | Urase et al. | D15/33 |
| 8,651,219 B2 * | 2/2014 | Yoshida et al. | 180/305 |
| 2003/0210972 A1 * | 11/2003 | Yukawa et al. | 414/394 |
| 2005/0047899 A1 * | 3/2005 | Sugimoto | 414/724 |
| 2005/0204590 A1 * | 9/2005 | Takano et al. | 37/347 |
| 2005/0210718 A1 * | 9/2005 | Ueda et al. | 37/466 |
| 2006/0080930 A1 * | 4/2006 | Brindle | 52/655.1 |
| 2006/0108171 A1 * | 5/2006 | Koga et al. | 180/327 |
| 2006/0226680 A1 * | 10/2006 | Matsumoto et al. | 296/190.01 |
| 2006/0266573 A1 * | 11/2006 | Ishii et al. | 180/326 |
| 2007/0068722 A1 * | 3/2007 | Miyake | 180/327 |
| 2007/0152438 A1 * | 7/2007 | Lacher et al. | 280/781 |
| 2010/0122862 A1 * | 5/2010 | Fujiwara et al. | 180/69.2 |
| 2010/0303541 A1 * | 12/2010 | Okumura et al. | 403/306 |
| 2011/0017537 A1 * | 1/2011 | Andou et al. | 180/89.16 |
| 2011/0074182 A1 * | 3/2011 | Kotani et al. | 296/193.07 |
| 2012/0061994 A1 * | 3/2012 | Maeba et al. | 296/193.06 |
| 2014/0017054 A1 * | 1/2014 | Motozu et al. | 414/687 |
| 2014/0291047 A1 * | 10/2014 | Matsumoto et al. | 180/69.4 |
| 2015/0075895 A1 * | 3/2015 | Inada et al. | 180/309 |

* cited by examiner

WORKING MACHINE

BACKGROUND OF THE INVENTION

1. Field of the Invention

The present invention relates to a working machine having an attachment that can swing around two axes of a horizontal axis and a vertical axis, and particularly relates to a front bracket that supports the attachment.

2. Description of the Related Art

FIG. 1 shows an example of such a working machine. The working machine shown is a small-type hydraulic shovel, and includes a lower propelling body 104, an upper slewing body 100 pivotably provided on the lower propelling body 104, and an attachment 101 fitted to a front part of the upper slewing body 100.

The attachment 101 has a bucket, an arm, a boom, and hydraulic cylinders. The attachment 101 is also supported by a front bracket 102 provided in the upper slewing body 100, via a swing bracket 103.

Specifically, a base end part of the attachment 101 is supported by the swing bracket 103 turnably around a horizontal axis HJ. The swing bracket 103 is supported by the front bracket 102 turnably around a vertical axis VJ. Accordingly, the hydraulic shovel shown can swing the attachment 101 to a right and left direction, in addition to being able to raise or lower the attachment 101 like a general hydraulic shovel.

Such structures of a swing bracket and a front bracket are disclosed in Japanese Unexamined Patent Application No. 2005-336920, Japanese Unexamined Patent Application No. 2005-16019, and Japanese Unexamined Patent Application No. 2002-146834, for example.

In general, a lower part of a rear part of the front bracket 102 is fixed to a bottom plate (not shown) pivotably supported by the lower propelling body 104. On the other hand, an upper part of the rear part of the front bracket 102 is welded to an upper end part of a vertical plate (not shown) stood on the bottom plate.

The working machine of this type has a problem in that stress tends to be concentrated to a welded portion of the front bracket 102, particularly, to a welded portion between the upper part of the rear part of the front bracket 102 and the vertical plate.

FIGS. 2A and 2B are enlarged views of portions indicated by an arrow X in FIG. 1.

When the attachment 101 is raised or lowered around the horizontal axis HJ, particularly when the attachment 101 is turned from a turned-up state (a virtual line) to a turned-down state (a solid line), strong load is applied to the front bracket 102 by the work of moment of force.

Specifically, the front bracket 102 is applied with force in a counterclockwise direction including force that presses the front bracket 102 upward, and force that stretches the front bracket 102 forward, as indicated by a void arrow in FIG. 2.

Further, when the attachment 101 is raised or lowered in a state that the attachment 101 is swung in a left or right direction, much stronger force is applied to the front bracket 102 in a left or right side.

Particularly, strong force is applied to the upper part of the front bracket 102.

Therefore, when the above force is applied to the front bracket 102, stress is concentrated to the welded portion of the front bracket 102, particularly, to the welded portion at the upper part of the rear part of the front bracket 102. Because the raise/lower operation of the attachment 101 is frequently performed, the stress concentration occurs repeatedly.

The upper part of the front bracket 102 is welded to an upper part of the vertical plate stood on the bottom plate. Because the upper part of the vertical plate is a free end, unlike a lower part of the vertical plate that is fixed to the bottom plate, strength and rigidity of the upper part of the vertical plate are structurally lower than strength and rigidity of the lower part of the vertical plate.

Consequently, when the attachment 101 is used for a long period, the welded portion of the front bracket 102 might be broken, and this is an important problem to be solved in securing durability of the working machine.

SUMMARY OF THE INVENTION

An object of the present invention is to provide a working machine that is excellent in strength and rigidity, by mitigating stress concentration to a welded portion of a front bracket.

To solve the above problem, the present invention provides a working machine including a lower propelling body, an upper slewing body provided pivotably around a pivot axis set in advance on the lower propelling body, and an attachment supported swingably by a front part of the upper slewing body around two axes, which are a vertical axis parallel to the pivot axis and a horizontal axis orthogonal to the pivot axis, wherein the upper slewing body has a bottom plate pivotably supported by the lower propelling body, a pair of vertical plates stood on the bottom plate so as to face each other in a right and left direction and to be extended to a front and rear direction, a swing bracket swingably supporting the attachment around the horizontal axis, and a front bracket swingably supporting the swing bracket around the vertical axis, wherein the front bracket includes a fixed part fixed to the bottom plate and the vertical plate, the fixed part having an upper wall part and a lower wall part opposite to each other in an up and down direction, a pair of sidewall parts opposite to each other in the right and left direction and also joining the upper wall part and the lower wall part, and a rear wall part joining a rear part of the upper wall part, a rear part of the lower wall part, and rear parts of the pair of sidewall parts, and a pair of protruded parts protruded backward from a rear part of the fixed part by exceeding the rear wall part and also integrally joined respectively to the upper parts of the sidewall parts, wherein the fixed part and both of the protruded parts are sandwiched between opposite surfaces that are opposite to each other at front parts of both of the vertical plates, and wherein the protruded parts are welded to the opposite surfaces of the vertical plates that are brought into contact with the protruded parts, and each welded portion between the protruded part and the opposite surface of the vertical plate is formed along an edge of the protruded part that is in contact with the opposite surface of the vertical plate.

According to the present invention, by mitigating the stress concentration to the welded portion of the front bracket, strength and rigidity of the front bracket can be improved.

DESCRIPTION OF THE PREFERRED EMBODIMENT

An embodiment of the present invention is described below with reference to the appended drawings. The following embodiment is an example of materialization of the present invention, and does not limit a technical range of the present invention.

Figure 3:
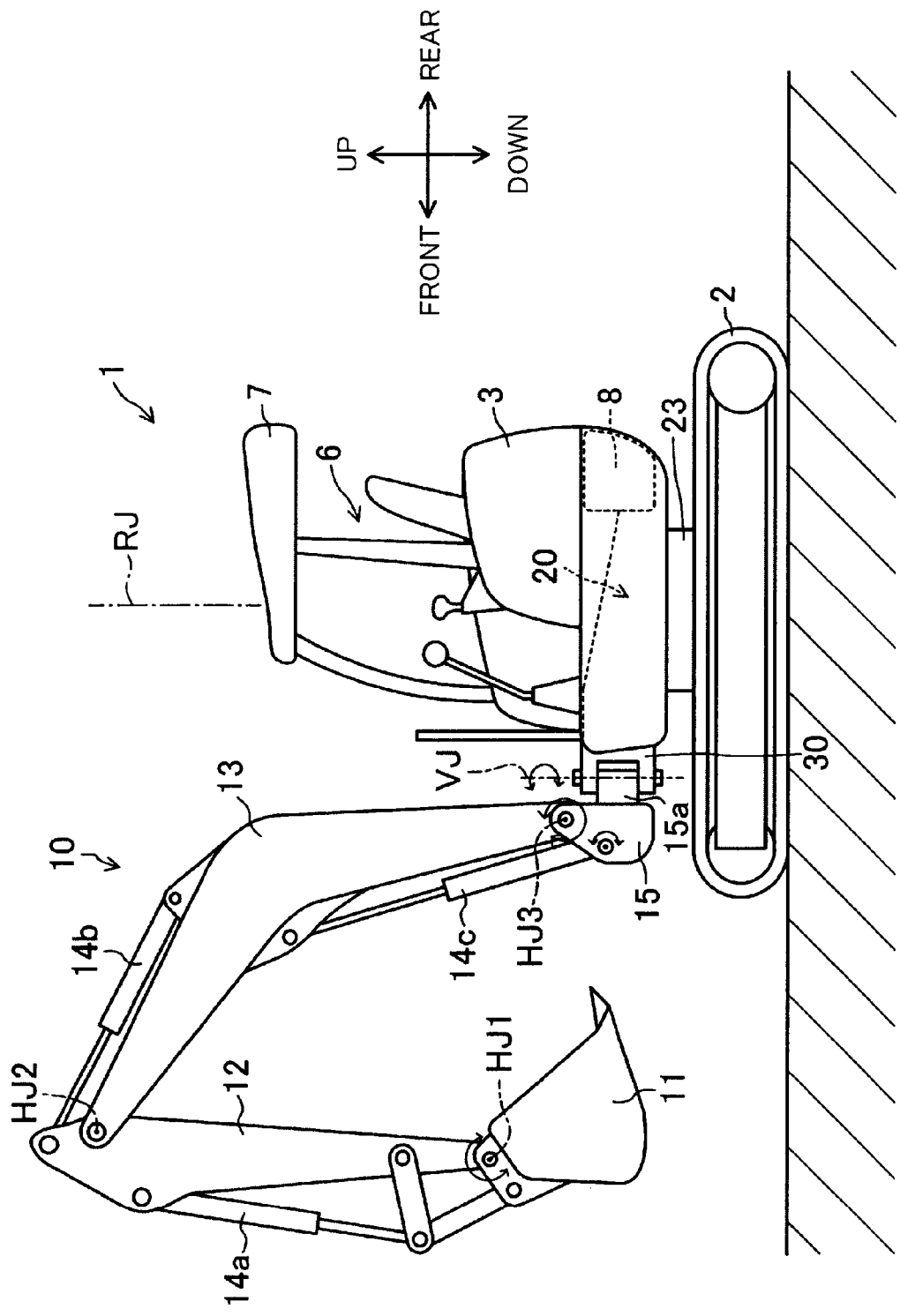
FIG. 3 is a schematic side view of a total configuration of a working machine according to an embodiment of the present invention.
Figure 4:
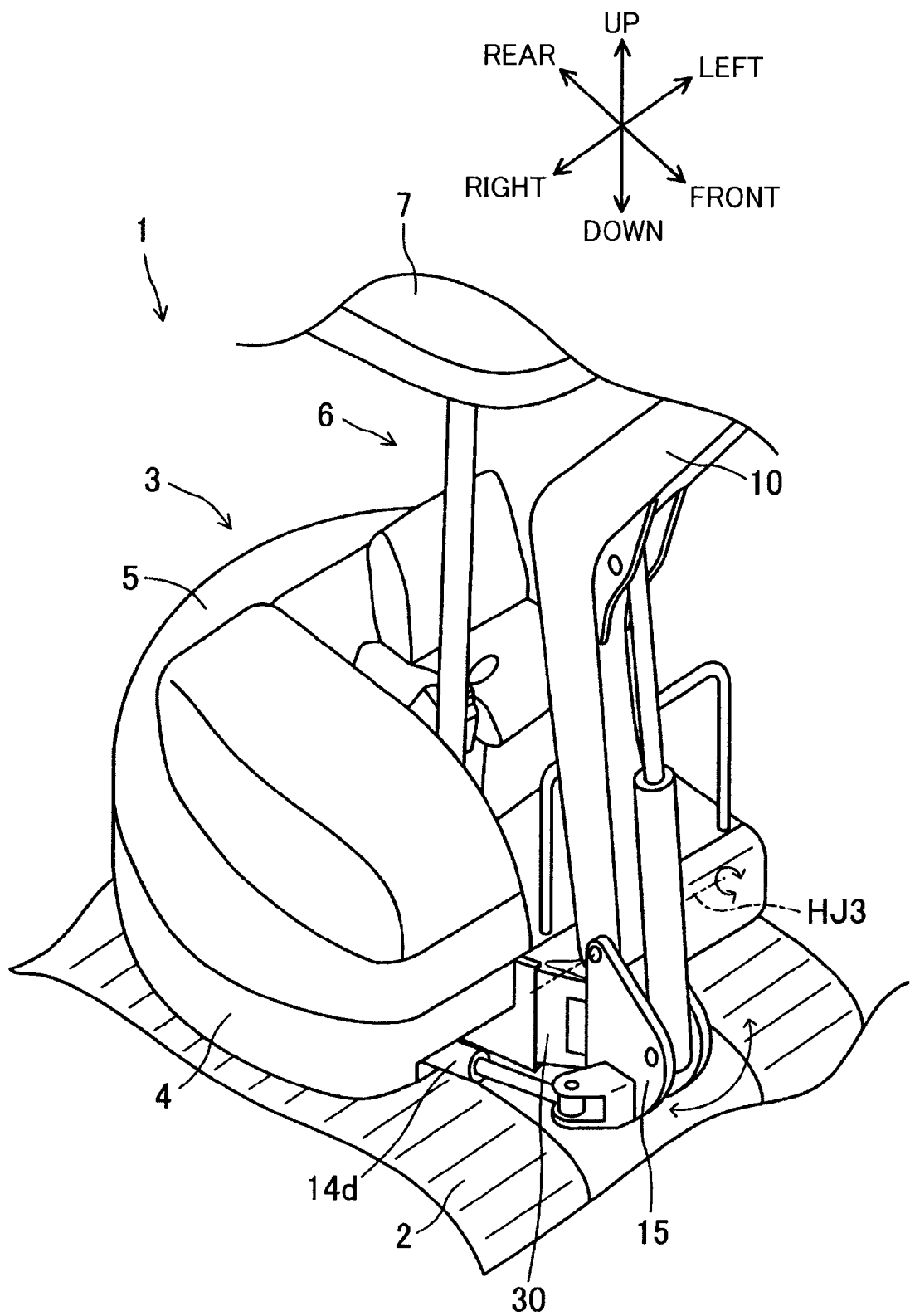
FIG. 4 is a schematic perspective view from a right upper inclined direction of the working machine shown in FIG. 3.

FIGS. 3 and 4 show a hydraulic shovel 1 (an example of a working machine) to which the present invention is applied. The hydraulic shovel 1 is a small type machine having a small slewing radius, and includes a lower propelling body 2 having crawlers, an upper slewing body 3 provided on the lower propelling body 2 so as to be pivotable around a pivot axis RJ set in advance, and an attachment 10 fitted to the upper slewing body 3.

The upper slewing body 3 includes a side machine room 4 for accommodating a fuel tank, a hydraulic oil tank, and the like and arranged at a right side of the upper slewing body 3, a rear machine room 5 for accommodating an engine and the like and arranged at a rear side of the upper slewing body 3, an operation space 6 provided with a drive seat, an operation lever, and the like and arranged at a left side of the upper slewing body 3, and a hood 7 arranged at an upper part of the upper slewing body 3 so as to cover the operation space 6.

Unless described otherwise, the description is performed below by using up and down, right and left, and front and rear directions viewed from an operator seated at the drive seat of the upper slewing body 3 (see FIG. 3 and others). The pivot axis RJ of the upper slewing body 3 is an axis parallel to the up and down direction.

The attachment 10 is swingably supported by a front part of the upper slewing body 3 around two axes of the vertical axis VJ parallel to the pivot axis RJ and the horizontal axis HJ orthogonal to the vertical axis VJ (parallel to the right and left direction). The attachment 10 includes a boom 13, an arm 12, a bucket 11, and hydraulic cylinders 14a to 14d.

Specifically, the bucket 11 is turnably supported by the distal end part of the arm 12. The bucket 11 swings around a first horizontal axis HJ1 parallel to the horizontal axis HJ, according to expansion and contraction of the hydraulic cylinder 14a as a bucket cylinder that is hydraulically controlled.

A base end part of the arm 12 is supported by the distal end part of the boom 13. The arm 12 swings around a second horizontal axis HJ2 parallel to the first horizontal axis HJ1, according to expansion and contraction of the hydraulic cylinder 14b as an arm cylinder that is hydraulically controlled.

A base end part of the boom 13 is supported by a swing bracket 15. The boom 13 swings around a third horizontal axis HJ3 parallel to the first horizontal axis HJ1, according to expansion and contraction of the hydraulic cylinder 14c as a boom cylinder that is hydraulically controlled.

The swing bracket 15 is supported by a front bracket 30 of the upper slewing body 3. The swing bracket 15 swings around the vertical axis VJ (see FIG. 3) parallel to the pivot axis RJ, according to expansion and contraction of the hydraulic cylinder 14d as a swing cylinder that is hydraulically controlled as shown in FIG. 4.

Therefore, in the hydraulic shovel 1, the attachment 10 can be raised or lowered and be also swung in a right and left direction by operating the operation lever and the like. To take balance in a front and rear direction with respect to the attachment 10 that is operating, the upper slewing body 3 has a counterweight 8 having a large weight disposed at the rear part of the upper slewing body 3.

The upper slewing body 3 also includes a base 20 which is excellent in strength and rigidity, to stably support the attachment 10, the counterweight 8, etc.

Figure 5:
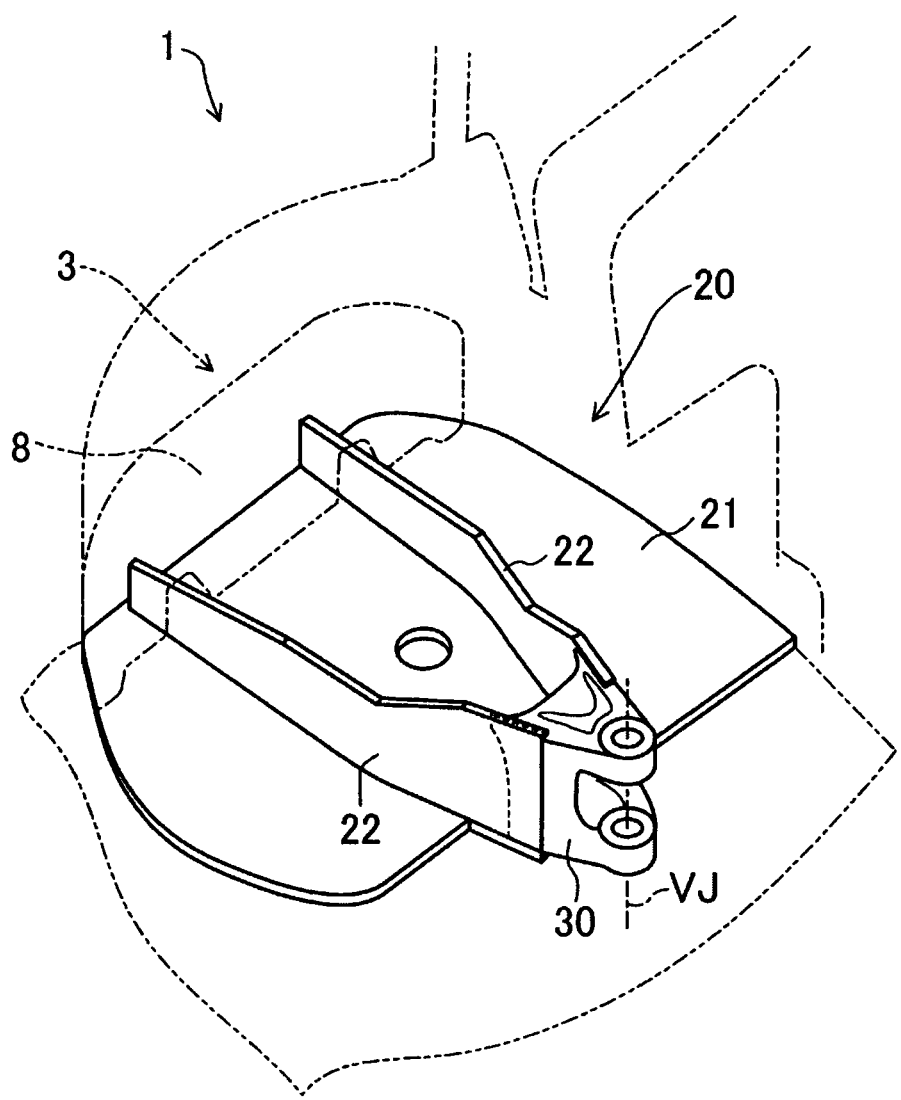
FIG. 5 is a schematic perspective view of a base of the working machine in FIG. 4.

FIG. 5 is a simplified perspective view of the base 20. The base 20 includes a bottom plate 21, a pair of vertical plates 22, the front bracket 30, and a ring-shaped pivot bearing 23 (see FIG. 8).

The bottom plate 21 includes a steel plate having a large thickness, frames assembled around the steel plate, etc. The bottom plate 21 is pivotably supported by the lower propelling body 2 via the pivot bearing 23, as described later. That is, the pivot bearing 23 is provided between the bottom plate 21 and the lower propelling body 2 so as to permit the bottom plate 21 to pivot relative to the lower propelling body 2.

The pair of vertical plates 22 is arranged at substantially a center portion in the right and left direction of the bottom plate 21, to mainly enhance strength and rigidity in the front and rear direction of the base 20. Each of the vertical plates 22 is formed of a band-shaped steel plate having a large thickness. The vertical plates 22 are stood on an upper surface of the bottom plate 21 so as to face each other in the right and left direction and to be extended to the front and rear direction. In the hydraulic shovel 1 according to the present embodiment, the vertical plates 22 are arranged in a V-shape so as to be separated from each other toward a rear side.

Although not shown in the drawings, a plurality of lateral beams extended in the right and left direction are disposed on the bottom plate 21. Strength and rigidity in the right and left direction of the base 20 are structurally reinforced by the lateral beams and the vertical plates 22.

The counterweight 8 is mounted on the bottom plate 21 in a state of being overlapped on the rear parts of the vertical plates 22 from above, so that the load of the counterweight 8 is received by the rear parts of the vertical plates 22. On the other hand, the front bracket 30 is attached to front parts of the vertical plates 22, to receive the load of the attachment 10 to be operated.

Figure 6:
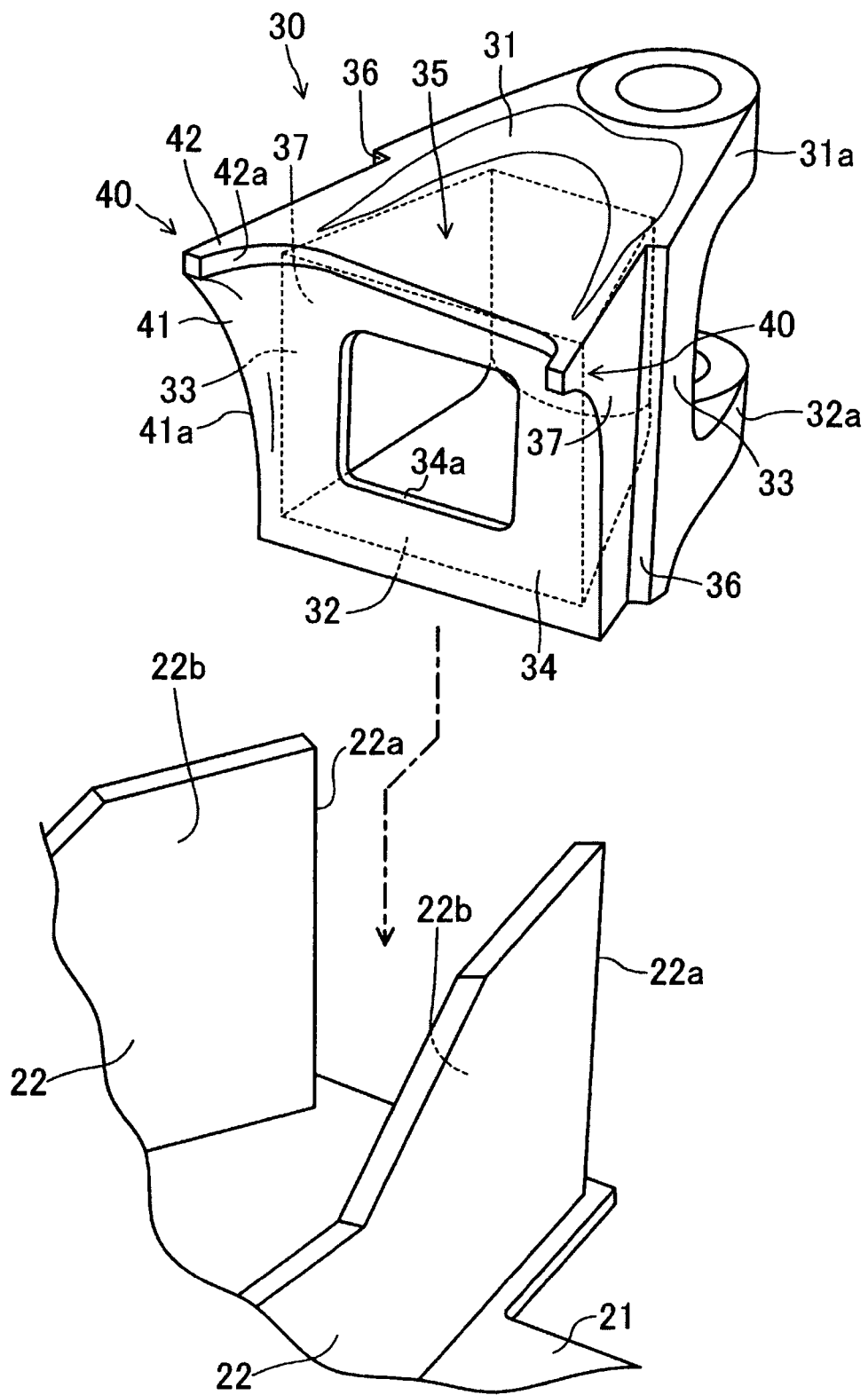
FIG. 6 is an exploded perspective view of a joint construction of the front bracket.
Figure 7:
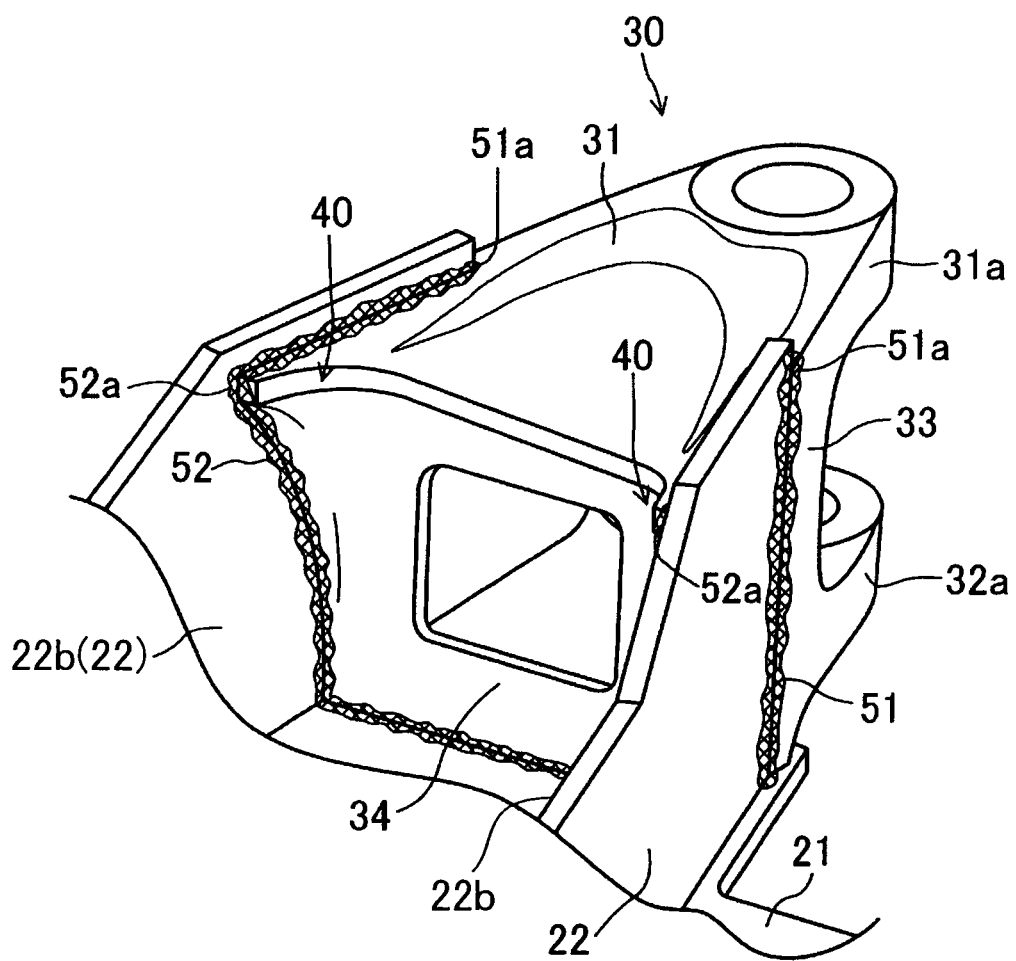
FIG. 7 is a perspective view of a joint construction of a front bracket.

Specifically, the front bracket 30 is fixed to the bottom plate 21 and the vertical plates 22 by welding, in a state that the front bracket 30 is sandwiched between front end parts of the vertical plates 22, as shown in detail in FIGS. 6 and 7.

The front bracket 30 is a molded product of integrated formation of an upper wall part 31, a lower wall part 32, a pair of sidewall parts 33, a rear wall part 34, and a pair of protruded parts 40.

The upper wall part 31 and the lower wall part 32 are wall-shaped portions, each wall part having approximately a triangular planar shape with a narrow front side. The upper wall part 31 and the lower wall part 32 are opposite to each other, by being separated from each other in the up and down direction.

Each sidewall part 33 is a wall-shaped portion for joining side edges, that are opposite to each other in the up and down direction, of the upper wall part 31 and the lower wall part 32. The sidewall parts 33 are opposite to each other by being separated to the right and left direction.

The sidewall parts 33 are provided at only rear-side portions of the upper wall part 31 and the lower wall part 32. The upper wall part 31 and the lower wall part 32 have respectively front end parts that are protruded to the front of the sidewall parts 33. Accordingly, at a front side of the front bracket 30, there are formed a pair of flange walls (supporting parts) 31a and 32a that are opposite to each other in the up and down direction, each flange wall having approximately a triangular planar shape.

A through-hole that penetrates through the flange walls 31a and 32a in the up and down direction is formed in the flange walls 31a and 32a. In a state that a shaft tube part 15a of the swing bracket 15 is inserted into between the flange walls 31a and 32a, a shaft along the vertical axis VJ is inserted into the through-hole of the flange walls 31a and 32a and the shaft tube part 15a. Accordingly, the swing bracket 15 is supported by the front bracket 30 (see FIGS. 3 and 9). The shaft tube part 15a is a shaft that is extended to the up and down direction.

The rear wall part 34 is a wall-shaped portion positioned at a rear part of the front bracket 30, and for joining a rear part of the upper wall part 31, a rear part of the lower wall part 32, and rear parts of the sidewall parts 33. The rear wall part 34 is approximately orthogonal to each of the upper wall part 31, the lower wall part 32, and the sidewall parts 33, and is arranged along upper and lower and right and left planes. At a center portion of the rear wall part 34, there is formed an opening 34a through which cables and pipes can be inserted.

A box structure having wall parts that face the up and down, right and left, and back directions is formed at the rear part of the front bracket 30, by the upper wall part 31, the lower wall part 32, the pair of sidewall parts 33, and the rear wall part 34. Because strength and rigidity of the rear part of the front bracket 30 are structurally reinforced by the fixed part 35, the rear part of the front bracket 30 is not easily deflected or deformed even when the load of the attachment 10 is applied.

The front bracket 30 includes the pair of protruded parts 40 protruded backward from the rear part of the fixed part 35 by exceeding the rear wall part 34 and also integrally joined to the upper parts of the sidewall parts 33.

The protruded parts 40 are protruded backward from right and left corner parts of an upper part of the fixed part 35, and are formed to become thinner backward, each protruded part 40 having an L-shaped front cross-sectional shape.

Specifically, the protruded parts 40 include a pair of sidewall protruded parts 41 protruded backward from the rear parts of the sidewall parts 33 by exceeding the rear wall part 34, and a pair of upper-wall protruded parts 42 joined respectively to the sidewall protruded parts 41 and also protruded backward from the rear part of the upper wall part 31 by exceeding the rear wall part 34.

Figure 9:
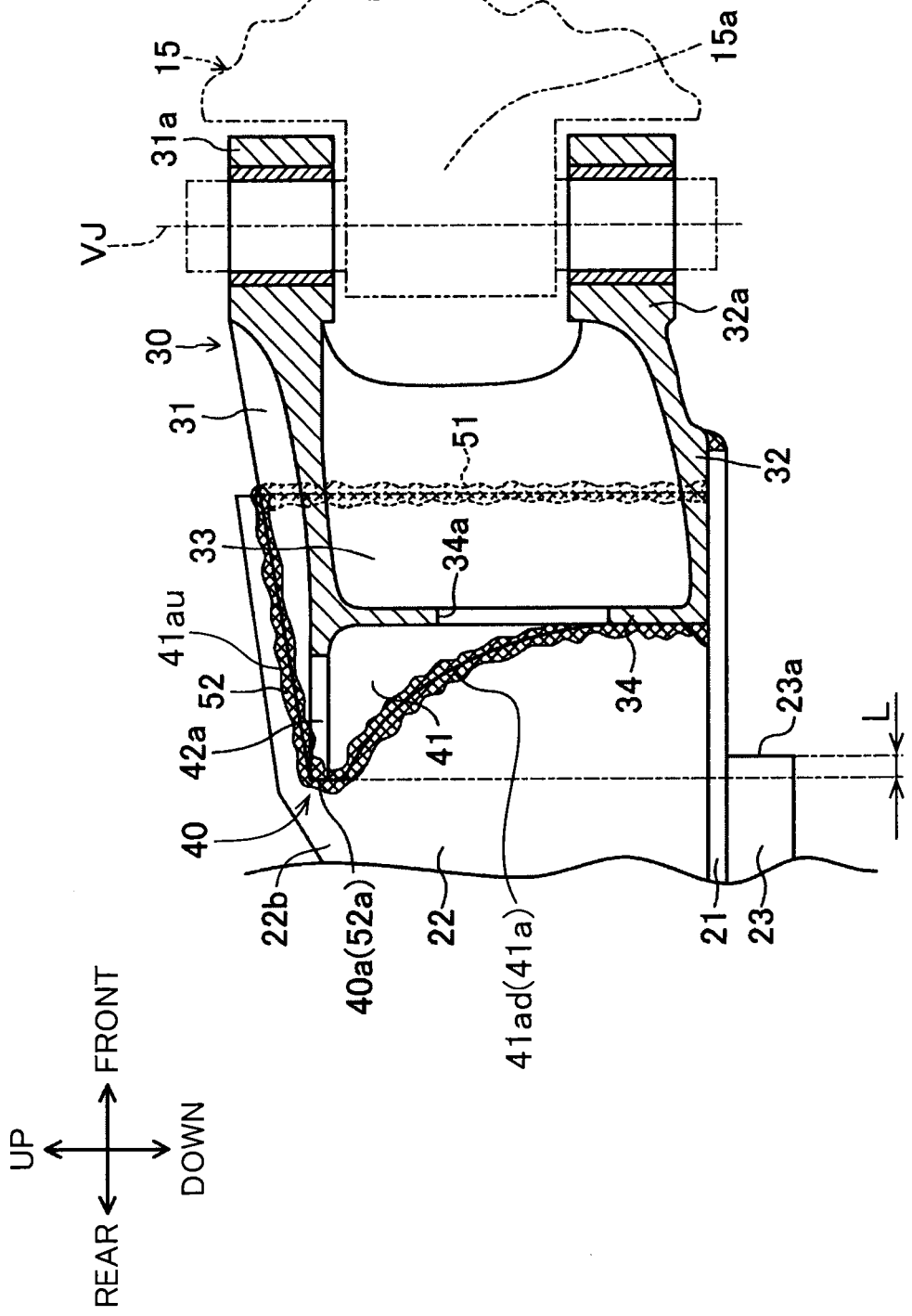
FIG. 9 is a cross-sectional view along a line Y-Y in FIG. 8.

As shown in FIG. 9, each protruded part 40 has a side surface shape that is spread forward from a rear end 40a of the protruded part 40. Specifically, out of an edge 41a of the sidewall protruded part 41, an upper-side portion 41au that faces an upper side of the protruded part 40 and a lower-side portion 41ad that faces a lower side of the protruded part 40 are inclined with respect to the front and rear direction so that an interval between the upper-side portion 41au and the lower-side portion 41ad becomes continuously spread forward. The upper-side portion 41au is linearly inclined, and the lower-side portion 41ad is inclined by being mildly curved downward from an upper end of the lower-side portion 41ad.

As shown in FIG. 6, each protruded part 40 has a planar shape spread forward from the rear end 40a. Specifically, the edge 42a of one upper-wall protruded part 42 that faces the other upper-wall protruded part 42 side is inclined with respect to the front and rear direction by being mildly curved toward an intermediate part in the right and left direction of the fixed part 35, proceeding from the rear end 40a of the protruded part 40 forward.

A front part of an outer side of each sidewall part 33 is provided with a contact surface 36 that faces backward and is also extended to the up and down direction. That is, a stage is formed at a boundary of the contact surface 36, on an outer side surface of each sidewall part 33. A portion at a rear side of the contact surface 36 out of the outer side surface of the sidewall part 33 and an outer side surface of each sidewall protruded part 41 become a joining surface 37 arranged at an inner side than a portion of a front side of the contact surface 36 out of the outer side surface of the sidewall part 33. A portion at front side of the vertical plates 22 of the front bracket 30 corresponds to extended part.

When the rear part of the front bracket 30 is inserted from above into between the front end parts of the vertical plates 22 while bringing front end surfaces 22a of the vertical plates 22 into contact with the contact surface 36, joined surfaces 37 are contacted to opposite surfaces 22b of the front end parts of the vertical plates 22. The opposite surfaces 22b are surfaces of the vertical plates 22 that face each other in the right and left direction.

Because the front end parts of the vertical plates 22 are arranged to spread the rear sides, the front bracket 30 engaged between the vertical plates 22 from above is restrained in the front and rear direction and is restricted from being extracted. In this state, the front bracket 30 is fixed to the bottom plate 21 and the vertical plates 22 by a plurality of welded portions.

Specifically, as shown in FIGS. 6 and 7, the outer side surface of each sidewall part 33 of the front bracket 30 is welded (also referred to as a first welded portion 51) along the front end surface 22a (the contact surface 36) of each vertical plate 22 on the contact surface 36. Each vertical plate 22 and each sidewall part 33 are welded to each other in a state that the front end surface of each vertical plate 22 and the contact surface 36 are brought into contact with each other.

The opposite surface 22b of each vertical plate 22 is welded (also referred to as a second welded portion 52) along an edge of the joining surface 37 of the front bracket 30.

Specifically, each second welded portion 52 includes a welded portion between the edge 41a of the sidewall protruded part 41 and the opposite surface 22b of each vertical plate 22, and a welded portion between the edge of the sidewall part 33 in front of the sidewall protruded part 41 and also at the rear of the contact surface 36 and the opposite surface 22b of each vertical plate 22. These welded portions are respectively continuous.

Front and rear edges of the lower wall part 32 are welded to the bottom plate 21. A welded portion between the rear edge of the lower wall part 32 and the bottom plate 21 is continuous to the second welded portion.

Therefore, in the hydraulic shovel 1, strength and rigidity of the joining structure between the front bracket 30 and the base 20 are remarkably improved.

That is, the fixed part 35 having a structure for improving strength and rigidity in the front bracket 30 is disposed to be embraced by the pair of vertical plates 22 and the bottom plate 21. Therefore, it is possible to secure high strength at portions where the fixed part 35 is assembled with the vertical plates 22 and the bottom plate 21.

Further, because the protruded parts 40 are provided on the front bracket 30, a welded range between the front bracket 30 and the vertical plates 22 can be increased. Therefore, it becomes possible to strengthen the welded portion between the front bracket 30 and the vertical plate 22, and it also becomes possible to mitigate stress concentration, by bearing the load generated in the front bracket 30 at a wider welded portion.

Figure 1:
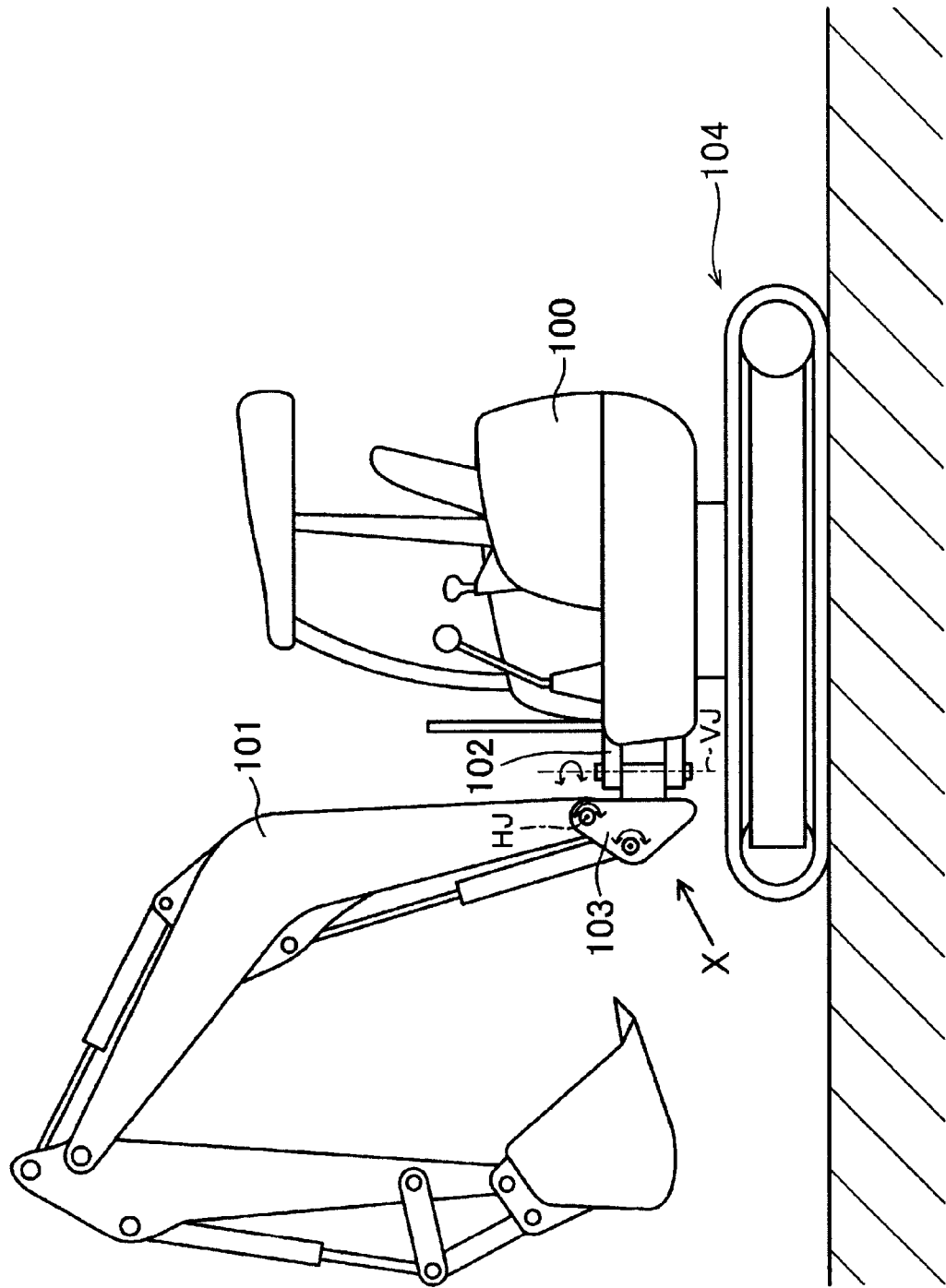
FIG. 1 is a schematic side view showing an example of a conventional working machine.
Figure 2A:
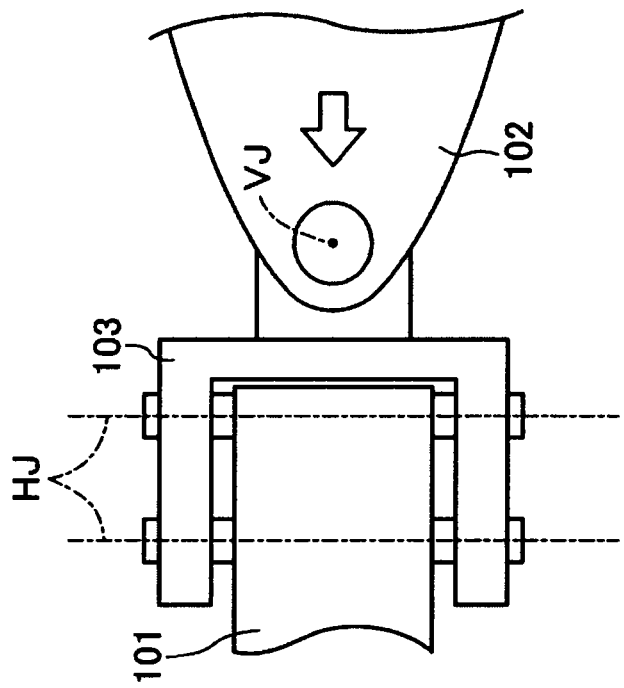
FIG. 2A is an enlarged view of a portion indicated by an arrow X in FIG. 1.
Figure 2B:
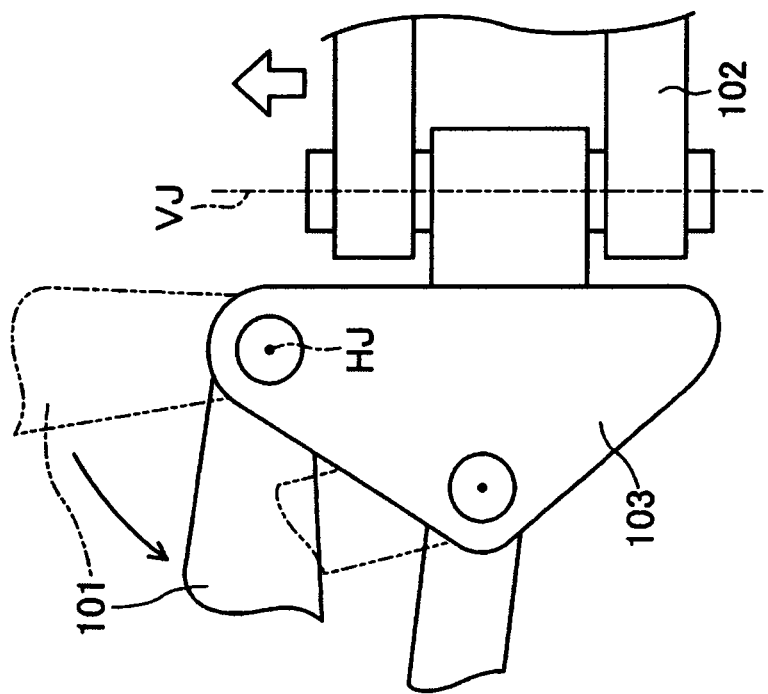
FIG. 2B is a plan view of the portion in FIG. 2A.

As shown in FIGS. 2A and 2B, force that works in the front bracket 30 by the operation of the attachment 10 includes force that stretches the upper part of the front bracket 30 forward and force that presses the rear part of the front bracket 30 upward. Therefore, this force tends to work strongly on particularly the upper part of the front bracket 30.

On the other hand, the protruded parts 40 are protruded backward from the fixed part 35 at the upper part of the front bracket 30 to which strong force is applied as shown in FIGS. 2A and 2B. Specifically, the protruded parts 40 are integrally joined to the upper parts of the sidewall parts 33 and the upper wall part 31.

Because the protruded parts 40 are welded to the opposite surfaces 22b of the vertical plates 22, strength and rigidity of the joining structure of the front bracket 30 and the vertical plates 22 can be effectively enhanced. Accordingly, even when strong force works on the front bracket 30, this force can be effectively received.

Force that strongly works on the upper part of the front bracket 30 tends to be easily concentrated to particularly upper ends 51a of the first welded portions 51 and rear ends 52a of the second welded portions 52. When the ends 51a and 52a of the welded portion are close to each other, stress concentration becomes high, and the welded portions tend to be easily broken.

On the other hand, according to the hydraulic shovel 1, because the rear ends 52a of the second welded portions 52 can be separated from the upper ends 51a of the first welded portions 51 by providing the protruded parts 40 on the front bracket 30, stress concentration can be effectively mitigated.

Further, the upper-side portion 41au and the lower-side (rear side) portion 41ad of the edge 41a of the sidewall protruded part 41 are inclined with respect to the front and rear direction so that the interval between the upper-side portion 41au and the lower-side portion 41ad becomes continuously spread forward.

Accordingly, stress that works on each second welded portion 52 can be effectively dispersed, and stress concentration can be further mitigated.

Further, because each upper-wall protruded part 42 has a planar shape spread forward, strength and rigidity of the protruded part 40 itself can be also reinforced in good balance. Accordingly, stress concentration to the second welded portions 52 can be also mitigated.

Figure 8:
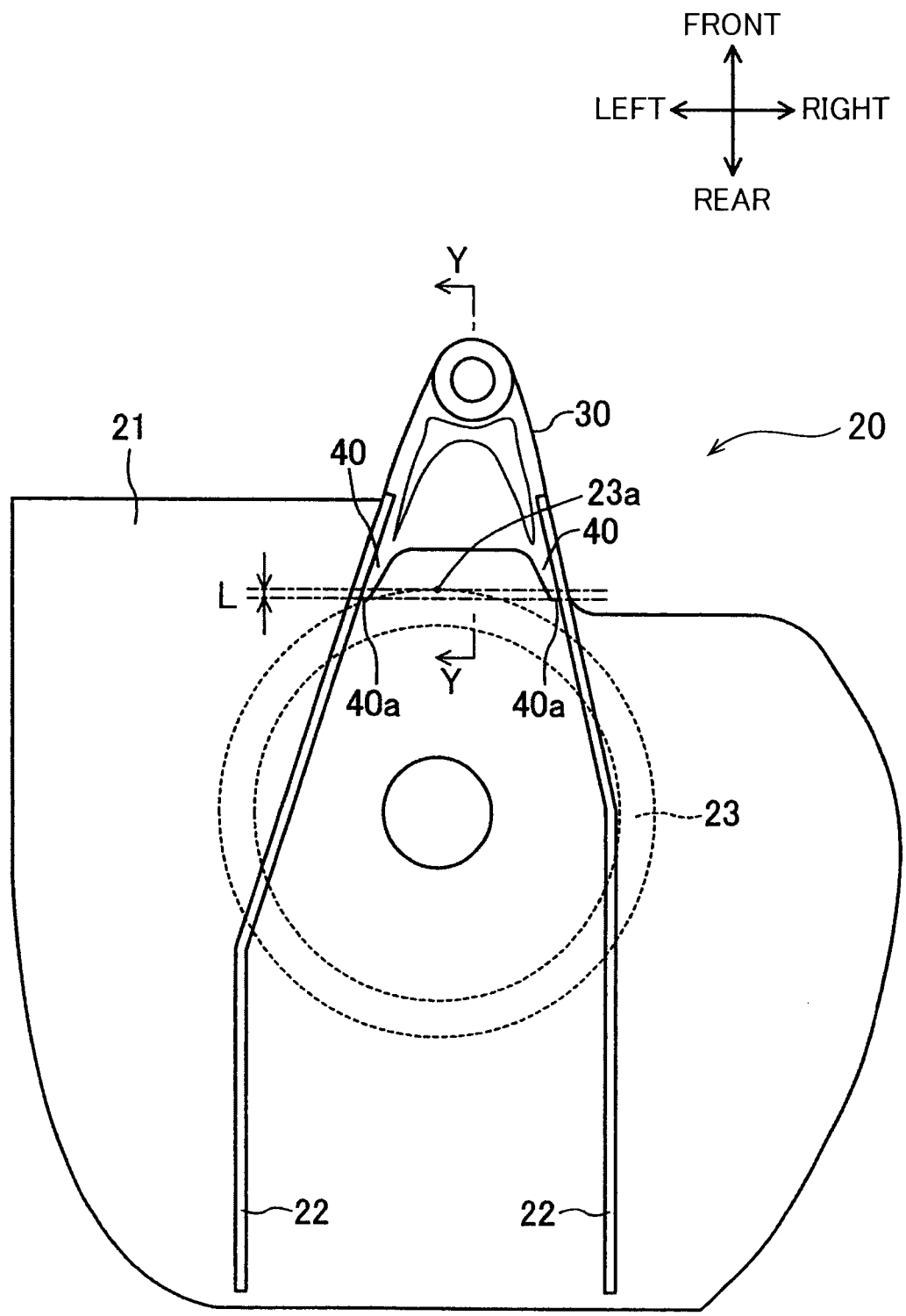
FIG. 8 is a schematic plan view of the base.

Further, in the hydraulic shovel 1, the rear ends 40a of the protruded parts 40 are arranged at the rear of a most front end 23a of an outer peripheral edge of the pivot bearing 23, as shown in FIGS. 8 and 9.

That is, in a planar view, when a tangent line in contact with the most front end 23a of the outer peripheral edge of the pivot bearing 23 is drawn, the rear ends 40a of the protruded parts 40 are arranged at the rear of tangent line (a distance between the most front end 23a and the rear ends 40a are indicated by L in FIGS. 8 and 9).

Accordingly, strength and rigidity of the joining structure of the front bracket 30 can be further improved.

Specifically, because a circular region at an inner side than the outer peripheral edge of the pivot bearing 23 on the bottom plate 21 is supported by the pivot bearing 23 along a whole periphery of the pivot bearing 23, the circular region is a high-rigidity region with substantially no deflection or deformation. Because of presence of the high-rigidity region, a portion at the rear of the most front end of the outer peripheral edge of the pivot bearing 23 on the bottom plate 21 is less deflected or deformed than a front portion.

Each rear end 40a of each protruded part 40, that is, the rear end 52a of the second welded portion 52, is arranged on the vertical plate 22 positioned at a portion at the rear of the most front end of the outer peripheral edge of the pivot bearing 23 on the bottom plate 21, where the bottom plate 21 is not easily deflected or deformed. Accordingly, stress concentration to the second welded portion 52 can be further mitigated.

When at least one of the rear ends 40a of the protruded parts 40 is arranged at the rear of the most front end 23a of the pivot bearing 23, stress concentration to the second welded portion 52 can be mitigated.

According to the above embodiment, because the interval between the upper-side portion 41au and the lower-side portion 41ad of the edge 41a of the sidewall protruded part 41 is continuously spread forward, a rapid change of an angle of the edge 41a of the protruded part 40 can be avoided. Therefore, stress that works on the welded portion between the protruded part 40 and the opposite surface 22b can be effectively dispersed.

According to the above embodiment, because each protruded part 40 is formed by the sidewall protruded part 41 and the upper-wall protruded part 42 that are arranged in a mutually crossing direction, strength of the protruded part 40 can be improved as compared with the case of forming the protruded part 40 by only the sidewall protruded part 41.

However, it is not the intension to exclude formation of the protruded part 40 by only the sidewall protruded part 41.

According to the above embodiment, because the welded portion between the protruded part 40 and the vertical plate 22 and the welded portion between the fixed part 35 and the vertical plate 22 are continuously formed, stress can be effectively dispersed at both the welded portions.

According to the above embodiment, because the welded portion between the fixed part 35 and the vertical plate 22 and the welded portion between the fixed part 35 (the lower wall part 32) and the bottom plate 21 are continuously formed, stress can be more effectively dispersed at both the welded portions.

According to the above embodiment, because the portions (the extended parts) at the front sides of the contact surfaces 36 of the front bracket 30 and the vertical plates are welded in a state that the contact surfaces 36 and the front end surfaces 22a of the vertical plates 22 are brought into contact with each other, deflection in the up and down direction of the vertical plates 22 and the front bracket 30 can be suppressed.

According to the above embodiment, the swing bracket 15 can be supported by using the portions (the extended parts), welded to the front end surfaces 22a of the vertical plates 22, in front of the contact surfaces 36 of the front bracket 30.

(Modifications and Others)

The working machine according to the present invention is not limited to the above embodiment, and also includes other various configurations.

Figure 10A:
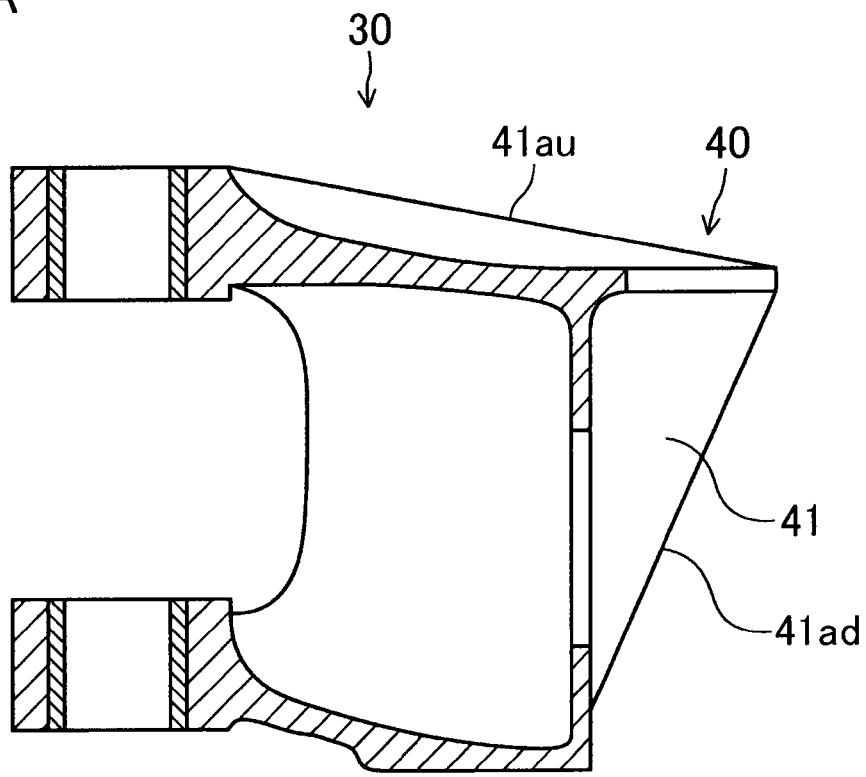
FIGS. 10A and 10B are schematic cross-sectional views of modifications of the front bracket.

The lower-side portion 41ad of the edge 41a of the sidewall protruded part 41 is not necessarily required to be inclined in a curve. For example, as shown in FIG. 10A, the lower-side portion 41ad may be linearly inclined as shown in FIG. 10A.

Figure 10B:
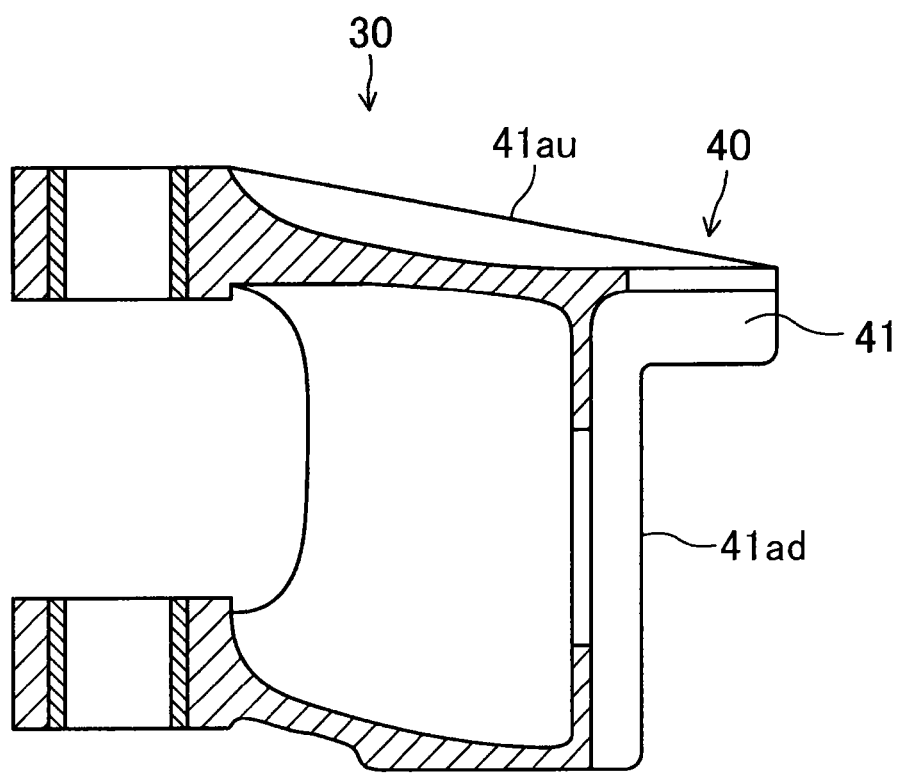

The lower-side portion 41ad of the edge 41a of the sidewall protruded part 41 is not necessarily required to be inclined with respect to the front and rear direction, and may be formed along the front and rear direction, as shown in FIG. 10B. In this case, the protruded part 40 has an L-shape in a side view.

Contrarily, the upper-side portion 41au of the edge 41a of the sidewall protruded part 41 may be inclined in a curve.

When at least one of the upper-side portion 41au and the lower-side portion 41ad of the edge 41a of the sidewall protruded part 41 is inclined with respect to the front and rear direction, stress concentration can be mitigated.

Figure 11:
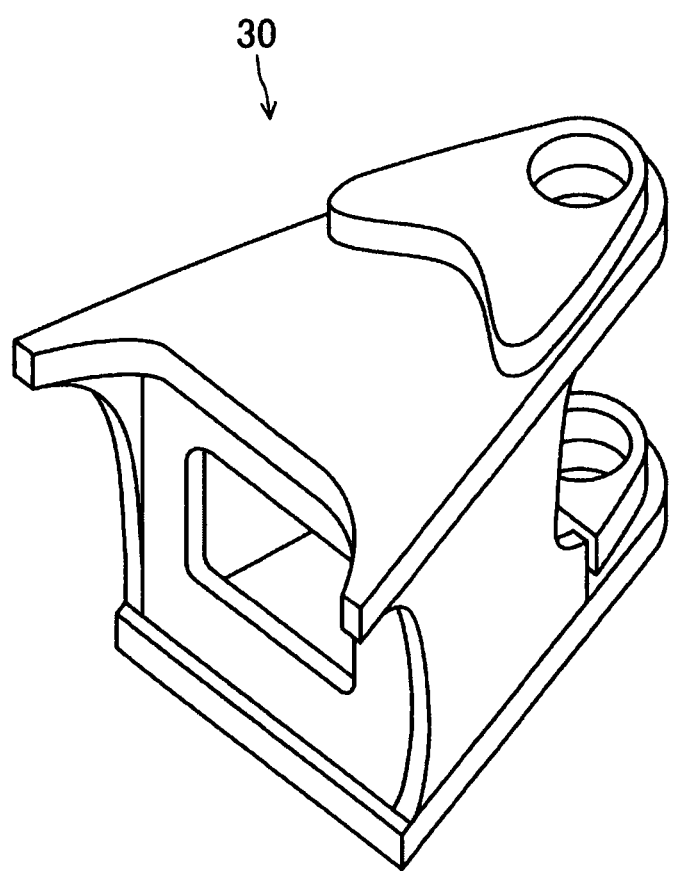
FIG. 11 is a schematic perspective view of a modification of the front bracket.

As shown in FIG. 11, the front bracket 30 may be formed of a plurality of steel plates that are joined to each other, without being limited to molding.

The above detailed embodiment mainly includes an invention having the following configuration.

That is, the present invention provides a working machine comprising a lower propelling body, an upper slewing body provided pivotably around a pivot axis set in advance on the lower propelling body, and an attachment supported swingably by a front part of the upper slewing body around two axes, which are a vertical axis parallel to the pivot axis and a horizontal axis orthogonal to the pivot axis, wherein the upper slewing body has a bottom plate pivotably supported by the lower propelling body, a pair of vertical plates stood on the bottom plate so as to face each other in a right and left direction and to be extended to a front and rear direction, a swing bracket swingably supporting the attachment around the horizontal axis, and a front bracket swingably supporting the swing bracket around the vertical axis, wherein the front bracket includes a fixed part fixed to the bottom plate and the vertical plate, and the fixed part having an upper wall part and a lower wall part opposite to each other in an up and down direction, a pair of sidewall parts opposite to each other in the right and left direction and also joining the upper wall part and the lower wall part, and a rear wall part joining a rear part of the upper wall part, a rear part of the lower wall part, and rear parts of the pair of sidewall parts, and a pair of protruded parts protruded backward from a rear part of the fixed part by exceeding the rear wall part and also integrally joined respectively to the upper parts of the sidewall parts, wherein the fixed part and both of the protruded parts are sandwiched between opposite surfaces that are opposite to each other at front parts of both of the vertical plates, and wherein the protruded parts are welded to the opposite surfaces of the vertical plates that are brought into contact with the protruded parts, and each welded portion between the protruded part and the opposite surface of the vertical plate is formed along an edge of the protruded part that is in contact with the opposite surface of the vertical plate.

In the present invention, the fixed part has an upper wall part, a lower wall part, a pair of sidewall parts, and a rear wall part, as a structure for improving strength and rigidity of the front bracket. Further, there are provided protruded parts that are protruded backward from the rear part of the fixed part by exceeding the rear wall part and are also integrally joined respectively to upper parts of the sidewall parts.

Further, the fixed part and protruded parts are sandwiched between opposite surfaces of front parts of vertical plates, and welded portions between the protruded parts and opposite surfaces of the vertical plates are formed respectively along edges of the protruded parts that are in contact with the opposite surfaces of the vertical plates.

As described above, according to the present invention, the fixed part having the structure for improving strength and rigidity of the front bracket is set to be disposed by the pair of vertical plates and the bottom plate. Therefore, it is possible to secure high strength and rigidity at portions where the fixed part is assembled with the vertical plates and the bottom plate.

Further, because the protruded parts are provided on the front bracket, a welded range between the front bracket and the vertical plates can be increased. Therefore, it becomes possible to strengthen the welded portion between the front bracket and the vertical plate, and it also becomes possible to mitigate stress concentration, by bearing the load generated in the front bracket at a wider welded portion.

Particularly, the protruded parts are joined to the upper parts (the upper parts of the sidewall parts) of the front bracket to which strong force is applied as shown in FIGS. 2A and 2B. Therefore, strength and rigidity of the joining structure of the front bracket can be effectively enhanced.

In the working machine, preferably, the upper slewing body includes a pivot bearing provided between the bottom plate and the lower propelling body so as to permit the bottom plate to pivot relative to the lower propelling body and also having a circular shape in a planar view, wherein a rear end of at least one of the protruded parts is arranged at the rear of a most front end of an outer peripheral edge of the pivot bearing.

Because the region of the bottom plate supported by the pivot bearing is little deflected or deformed, a portion at the rear of the most front end of the outer peripheral edge of the pivot bearing on the bottom plate is not easily deflected or deformed as compared with a front portion.

Therefore, by arranging the rear end of the protruded part on the vertical plate positioned at a portion of the bottom plate that is not easily deflected or deformed, like the above aspect, stress concentration at the welded portion of the rear end of the protruded part can be mitigated.

In the working machine, preferably, in the edge of the protruded part that is in contact with the opposite surface of the vertical plate, at least one of an upper-side portion that faces an upper side of the protruded part and a lower-side portion that faces a lower side of the protruded part is inclined to the front and rear direction so that an interval between the upper-side portion and the lower-side portion becomes continuously spread forward.

According to the above aspect, because the interval between the upper-side portion and the lower-side portion of the edge of the protruded part is continuously spread forward, a rapid change of the angle of the edge of the protruded part can be avoided. Therefore, stress that works on the welded portion between the protruded part and the opposite surface can be effectively dispersed.

In the working machine, preferably, the protruded parts include sidewall protruded parts that are protruded backward from the sidewall parts by exceeding the rear wall part, and upper-wall protruded parts that are joined to the sidewall protruded parts and are protruded backward from the upper wall part by exceeding the rear wall part.

According to the above aspect, because each protruded part can be formed by the sidewall protruded part and the upper-wall protruded part that are arranged in a mutually crossing direction, strength of the protruded part can be improved as compared with the case of forming the protruded part by only the sidewall protruded part.

In the working machine, preferably, the fixed part is welded to the opposite surface of the vertical plate continuously from the welded portion between the protruded part and the opposite surface of the vertical plate.

According to the above aspect, because the welded portion between the protruded part and the vertical plate and the welded portion between the fixed part and the vertical plate can be continuously formed, stress can be effectively dispersed at both welded portions.

In the working machine, preferably, the fixed part is welded to an upper surface of the bottom plate continuously from the welded portion between the fixed part and the opposite surface of the vertical plate.

According to the above aspect, because the welded portion between the fixed part and the vertical plate and the welded portion between the fixed part and the bottom plate can be continuously formed, stress can be effectively dispersed at both welded portions.

In the working machine, preferably, the front bracket includes an extended part that is extended from the fixed part to the front of the vertical plates, and the extended part has a pair of contact surfaces that are respectively brought into contact with front end surfaces of the vertical plates and is also welded to the vertical plate along the contact surface in a state where the contact surface and the front end surface of the vertical plate are brought into contact with each other.

According to the above aspect, because the extended part and the vertical plates are welded to each other in a state that the contact surfaces of the extended part and the front end surfaces of the vertical plates are brought into contact with each other, deflection in the up and down direction of the vertical plates and the front bracket can be suppressed.

In the working machine, preferably, the extended part is provided with a supporting part that swingably supports the swing bracket around the vertical axis.

According to the above aspect, the swing bracket can be supported by using the extended part welded to the front end surface of the vertical plates.

This application is based on Japanese Patent application No. 2013-009570 filed in Japan Patent Office on Jan. 22, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A working machine comprising a lower propelling body, an upper slewing body provided pivotably around a pivot axis set in advance on the lower propelling body, and an attachment supported swingably by a front part of the upper slewing body around two axes, which are a vertical axis parallel to the pivot axis and a horizontal axis orthogonal to the pivot axis,
   wherein the upper slewing body has a bottom plate pivotably supported by the lower propelling body, a pair of vertical plates stood on the bottom plate so as to face each other in a right and left direction and to be extended to a front and rear direction, a swing bracket swingably supporting the attachment around the horizontal axis, and a front bracket swingably supporting the swing bracket around the vertical axis,
   wherein the front bracket includes:
   a fixed part fixed to the bottom plate and the pair of vertical plates, the fixed part having an upper wall part and a lower wall part opposite to each other in an up and down direction, a pair of sidewall parts opposite to each other in the right and left direction and also joining the upper wall part and the lower wall part, and a rear wall part joining a rear part of the upper wall part, a rear part of the lower wall part, and rear parts of the pair of sidewall parts, and
   a pair of protruded parts protruded backward from a rear part of the fixed part by exceeding the rear wall part and also integrally joined respectively to the upper parts of the sidewall parts,
   wherein the fixed part and both of the protruded parts are sandwiched between opposite surfaces that are opposite to each other at front parts of both of the vertical plates, and
   wherein the protruded parts are welded to the opposite surfaces of the pair of vertical plates that are brought into contact with the protruded parts, and each welded portion between the protruded part and the opposite surface of the vertical plate is formed along an edge of the protruded part that is in contact with the opposite surface of the vertical plate.

2. The working machine according to claim 1, wherein the upper slewing body includes a pivot bearing provided between the bottom plate and the lower propelling body so as to permit the bottom plate to pivot relative to the lower propelling body and also having a circular shape in a planar view, and
   a rear end of at least one of the protruded parts is arranged at the rear of a most front end of an outer peripheral edge of the pivot bearing.

3. The working machine according to claim 1, wherein in the edge of each protruded part that is in contact with the opposite surface of the vertical plate, at least one of an upper-side portion that faces an upper side of the protruded part and a lower-side portion that faces a lower side of the protruded part is inclined to the front and rear direction so that an interval between the upper-side portion and the lower-side portion becomes continuously spread forward.

4. The working machine according to claim 1, wherein the pair of protruded parts include sidewall protruded parts that are protruded backward from the sidewall parts by exceeding the rear wall part, and upper-wall protruded parts that are joined to the sidewall protruded parts and are protruded backward from the upper wall part by exceeding the rear wall part.

5. The working machine according to claim 1, wherein the fixed part is welded to each of the opposite surfaces of the pair of vertical plates continuously from the welded portion between the pair of protruded parts and the opposite surfaces of the pair of vertical plates.

6. The working machine according to claim 5, wherein the fixed part is welded to an upper surface of the bottom plate continuously from the welded portion between the fixed part and the opposite surfaces of the pair of vertical plates.

7. The working machine according to claim 1, wherein the front bracket includes an extended part that is extended from the fixed part to the front of the vertical plates, and the extended part has a pair of contact surfaces that are respectively brought into contact with front end surfaces of the vertical plates and is also welded to each of the vertical plates along the respective contact surface in a state where the respective contact surface and the respective front end surface of the vertical plate are brought into contact with each other.

8. The working machine according to claim 7, wherein the extended part is provided with a supporting part that swingably supports the swing bracket around the vertical axis.

* * * * *